ID 1900898288

United States Patent
DeLuca et al.

(10) Patent No.: US 9,892,096 B2
(45) Date of Patent: Feb. 13, 2018

(54) CONTEXTUAL HYPERLINK INSERTION

(71) Applicant: International Business Machines Corporation, Armonk, NY (US)

(72) Inventors: Lisa Seacat DeLuca, Baltimore, MD (US); Geetika T. Lakshmanan, Winchester, MA (US); Michael Muller, Medford, MA (US)

(73) Assignee: International Business Machines Corporation, Armonk, NY (US)

( * ) Notice: Subject to any disclaimer, the term of this patent is extended or adjusted under 35 U.S.C. 154(b) by 405 days.

(21) Appl. No.: 14/199,039

(22) Filed: Mar. 6, 2014

(65) Prior Publication Data
US 2015/0254216 A1    Sep. 10, 2015

(51) Int. Cl.
G06F 17/00    (2006.01)
G06F 17/22    (2006.01)
G06F 17/30    (2006.01)

(52) U.S. Cl.
CPC ...... G06F 17/2235 (2013.01); G06F 17/3087 (2013.01)

(58) Field of Classification Search
CPC .................................................. G06F 17/2235
See application file for complete search history.

(56) References Cited

U.S. PATENT DOCUMENTS

| | | | |
|---|---|---|---|
| 5,978,817 A | 11/1999 | Giannandrea et al. | |
| 6,785,670 B1 | 8/2004 | Chiang et al. | |
| 7,499,940 B1 | 3/2009 | Gibbs | |
| 8,370,329 B2 | 2/2013 | Gutt et al. | |
| 2002/0072921 A1* | 6/2002 | Boland | G06Q 10/063 709/206 |
| 2005/0154723 A1* | 7/2005 | Liang | G06F 17/30109 |
| 2006/0059225 A1* | 3/2006 | Stonehocker | G06F 17/30884 709/202 |
| 2006/0277455 A1 | 12/2006 | Yamada et al. | |
| 2007/0050711 A1* | 3/2007 | Walker | G06F 17/30855 715/205 |
| 2007/0118803 A1* | 5/2007 | Walker | G06F 17/30855 715/744 |
| 2007/0136245 A1* | 6/2007 | Hess | G06F 17/30053 |
| 2009/0235150 A1* | 9/2009 | Berry | G06F 17/30038 715/205 |

(Continued)

FOREIGN PATENT DOCUMENTS

JP     2008101166 A     4/2008

OTHER PUBLICATIONS

Adium, "Link Insertion: support Firefox 3.6, 4", retrieved on Jun. 17, 2013 from website: https://trac.adium.im/ticket/13828.

(Continued)

*Primary Examiner* — Scott Baderman
*Assistant Examiner* — Barbara Level
(74) *Attorney, Agent, or Firm* — Edward J. Wixted, III

(57) ABSTRACT

In a method for identifying and inserting hyperlinks within a software application, a processor receives a request for one or more recommended hyperlinks, wherein the request corresponds to a location for a hyperlink insertion in the software application. A processor receives contextual information about the request. A processor identifies one or more hyperlinks corresponding to the contextual information. A processor receives a selected hyperlink from the one or more hyperlinks. A processor inserts the selected hyperlink at the location in the software application.

16 Claims, 4 Drawing Sheets

(56) References Cited

U.S. PATENT DOCUMENTS

| | | | | |
|---|---|---|---|---|
| 2010/0114822 A1* | 5/2010 | Pollock | .................. | H04L 67/36 707/623 |
| 2010/0185644 A1 | 7/2010 | Gutt et al. | | |
| 2010/0251086 A1* | 9/2010 | Haumont | ............... | G06Q 30/02 715/205 |
| 2011/0072033 A1 | 3/2011 | White et al. | | |
| 2013/0227049 A1* | 8/2013 | Ueno | ................ | G06F 17/30902 709/213 |
| 2015/0143211 A1* | 5/2015 | Kaufthal | ................. | G06F 17/24 715/205 |

OTHER PUBLICATIONS

Devanbu et al., "CHIME: Customizable Hyperlink Insertion and Maintenance Engine for Software Engineering Environments", Software Engineering, 1999. Proceedings of the 1999 International Conference Software Engineering, Los Angeles, California, Copyright ACM 1999, pp. 473-482.

ORB, "Email Hyperlink Inserted into Outlook Email Format by ORB", retrieved on Jun. 17, 2013 from website: http://forums.orb.com/viewtopic.php?p=12799.

Google Groups, "Keyword Hyperlink Insertion—Good or Bad?", retrieved on Jun. 17, 2013 from website: http://productforums.google.com/forum/#!msg/webmasters/ZPG9z1J.

Super User, "How Can I send an Outlook 2007 Email Containing a Linked Image?", retrieved on Jun. 17, 2013 from website: http://superuser.com/questions/156090/how-can-i-send-an-outlook-2007-email-containing-a-linked-image.

Yahoo Voices, "How to Insert a Hyperlink into an Email Using Microsoft Outlook 2003 or 2007", retrieved on Jun. 17, 2013 from website: http://voices.yahoo.com/how-insert-hyperlink-into-e-mail-using-mocrosoft-489595.html.

* cited by examiner

CONTEXTUAL HYPERLINK INSERTION

FIELD OF THE INVENTION

The present invention relates generally to the field of hyperlink insertion, and more particularly to providing recommended uniform resource locator (URL) hyperlinks within an application.

BACKGROUND OF THE INVENTION

A hyperlink is a reference to data that a user can directly follow. A hyperlink points to a whole document or to a specific element within a document. A hyperlink may link to another place in the same document or to an entirely different document. Typically, a user will click on a hyperlink, which may take the form of a picture or text, to follow the link. Hyperlinks are an essential ingredient to hypertext systems, including the World Wide Web. Oftentimes, a hyperlink links to another web page. Hyperlinks may be created and inserted into a variety of documents and pages, such as web pages, emails, or word processing documents. A hyperlink consists of two parts; first, the full address of the external or internal link and second, the text or image that is displayed on the page or document upon which the hyperlink resides. When a hyperlink is displayed as text within a page or document, the text of the hyperlink often is descriptive of the webpage to which it links. Alternatively, hyperlink text may be displayed as the uniform resource locator (URL) of the web page to which it links.

The hypertext system is a type of database system in which objects can be linked to each other. When a user selects an object, they can see other objects that are linked to it. A user can move from one object to another even though they may have different forms. Hypertext systems are useful for organizing and browsing through large databases that consist of disparate types of information.

A web search engine is a software system that is designed to search for information on the World Wide Web. Oftentimes, users access web search engines through the use of a web browser. A web browser is a software application for retrieving, presenting and traversing information resources on the World Wide Web. Many commercial web browsers include the capability to track and store Internet browsing history.

SUMMARY

Aspects of an embodiment of the present invention disclose a method, computer program product, and computing system for identifying and inserting hyperlinks within a software application. A processor receives a request for one or more recommended hyperlinks, wherein the request corresponds to a location for a hyperlink insertion in the software application. A processor receives contextual information about the request. A processor identifies one or more hyperlinks corresponding to the contextual information. A processor receives a selected hyperlink from the one or more hyperlinks. A processor inserts the selected hyperlink at the location in the software application.

DETAILED DESCRIPTION

Figure 1:
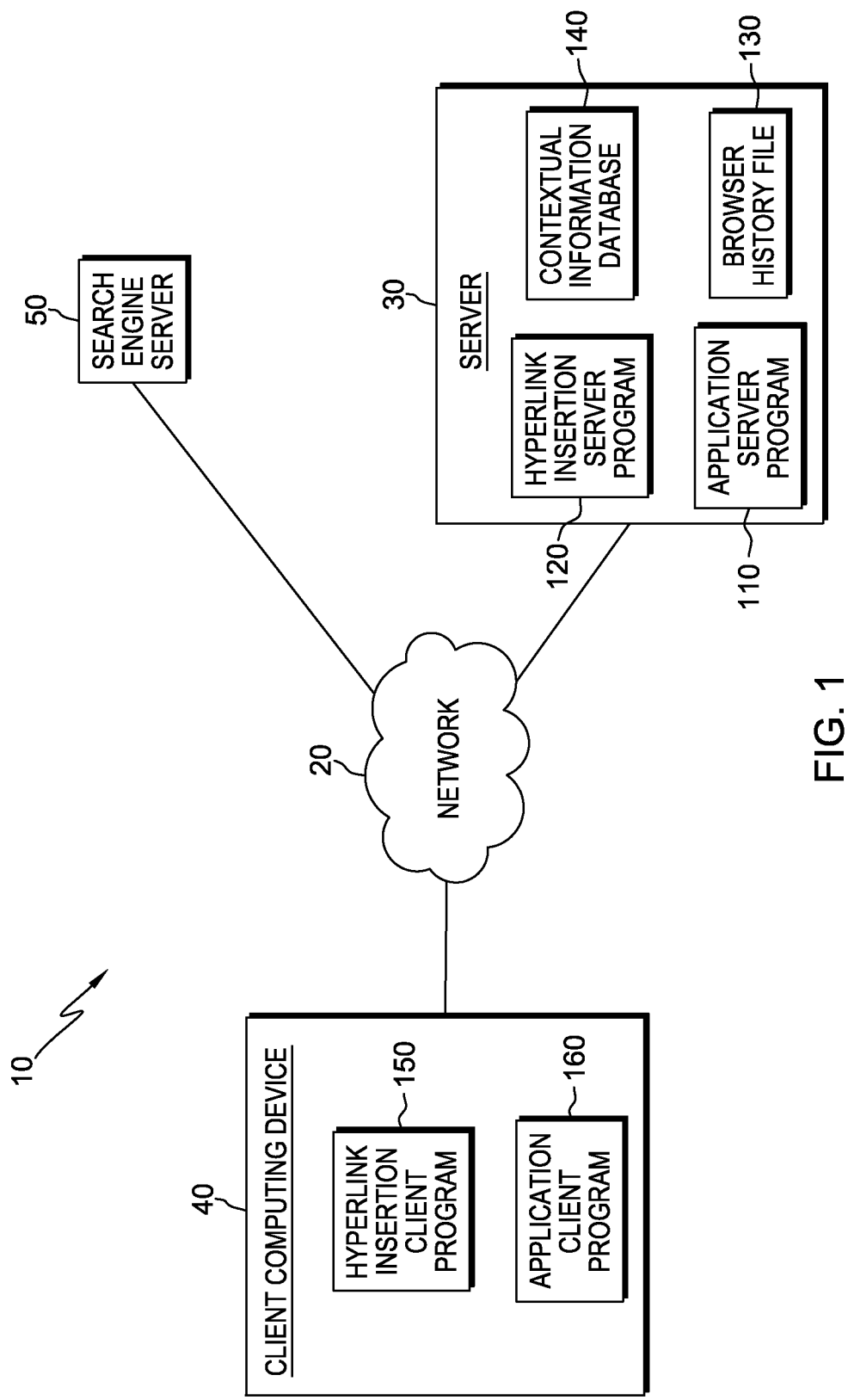
FIG. 1 depicts a diagram of a computing system in accordance with one embodiment of the present invention.

Embodiments of the present invention recognize that if a user wishes to insert a hyperlink into the text of a software application, such as an email or word processing document, they have to type in the entire link. If the user does not know the link, they have to find the link by either searching the Internet via a search engine or parsing through lists of bookmarked and/or previously visited links. They then have to copy and paste this link into the software application. Embodiments of the present invention recognize and alleviate the difficulty of having to explicitly type out a hyperlink or leave a software application in order to retrieve a hyperlink.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

FIG. 1 depicts a diagram of computing system 10 in accordance with one embodiment of the present invention. FIG. 1 provides an illustration of one embodiment and does not imply any limitations with regard to the environments in which different embodiments may be implemented.

In the depicted embodiment, computing system 10 includes server 30, client computing device 40, and search engine server 50 interconnected over network 20. Network 20 may be a local area network (LAN), a wide area network (WAN) such as the Internet, a cellular data network, any combination thereof, or any combination of connections and protocols that will support communications between server 30, client computing device 40, and search engine server 50 in accordance with embodiments of the invention. Network 20 may include wired, wireless, or fiber optic connections. Computing system 10 may include additional computing devices, servers, or other devices not shown.

Server 30 may be a management server, a web server, or any other electronic device or computing system capable of receiving and sending data. In some embodiments, server 30 may be a laptop computer, tablet computer, netbook computer, personal computer (PC), a desktop computer, a personal digital assistant (PDA), a smart phone, or any programmable electronic device capable of communicating with client computing device 40 and search engine server 50 via network 20. In other embodiments, server 30 may represent a server computing system utilizing multiple computers as a server system, such as in a cloud computing environment. Server 30 contains application server program 110, hyperlink insertion server program 120, browser history file 130, and contextual information database 140. Server 30 may include components, as depicted and described in further detail with respect to FIG. 4.

Client computing device 40 may be a desktop computer, laptop computer, netbook computer, tablet computer, personal digital assistant (PDA), or smart phone. In general, client computing device 40 may be any electronic device or computing system capable of sending and receiving data, and communicating with server 30 over network 20. In some embodiments, client computing device 40 may be capable of communicating with search engine server 50 over network 20. Client computing device 40 contains hyperlink insertion client program 150 and application client program 160. Client computing device 40 may include components, as depicted and described in further detail with respect to FIG. 4.

Search engine server 50 may be a management server, a web server, or any other electronic device capable of receiving and sending data. In another embodiment, search engine server 50 may represent a server computing system utilizing multiple computers as a server system, such as in a cloud computing environment. Search engine server 50 may host or manage a web search engine designed to search for information on the Internet. Search engine server 50 may allow outside users or applications to access and use the web search engine.

Application client program 160 and application server program 110 may be any number of client and server programs, respectively, wherein the application or program allows a user to insert a hyperlink. For example, a server and client program may exist for an email program, a calendaring program, a word processing program, or any other program where a hyperlink may be inserted into a page or document. As a particular example, if the program is an email program, application client program 160 will be an email client program, and application server program 110 will be an email server program. In general, application client program 160 is the client-side program with respect to application server program 110.

Application client program 160 may be a dedicated client program, a function integrated within another program, or any other program or function that can communicate with application server program 110 and provide a user interface for utilizing the features of application server program 110. Application client program 160 may allow users to compose documents, write emails, schedule meetings, or otherwise record information. Recorded information may include hyperlinks to one or more web pages or other documents. In one embodiment, application client program 160 resides on client computing device 40. In other embodiments, application client program 160 may reside on another computing device, or another server, provided that application client program 160 is accessible to hyperlink insertion client program 150 and has access to application server program 110.

Application server program 110 operates to perform application functions. Application functions are dependent upon the form of application server program 110. For example, if application server program 110 is an email program, application server program 110 may operate to send, receive, store, and otherwise manage emails and maintain a list of contacts. If application server program 110 is a word processor, application server program 110 may operate to store and manage word processing documents. In general, application server program 110 may be any type of program or application that utilizes hyperlink insertion. In one embodiment, application server program 110 resides on server 30. In other embodiments, application server program 110 may reside on another server, another computing device, or client computing device 40, provided that application server program 110 is accessible to hyperlink insertion server program 120 and has access to application client program 160.

Hyperlink insertion client program 150 may be a dedicated hyperlink insertion program, a function integrated within another program, or any program that can communicate with hyperlink insertion server program 120 and/or application client program 160, and provide a user interface for recommending hyperlinks for insertion into a document or page in an application by accessing an internet search engine, such as the internet search engine managed by search engine server 50, or by searching browser history, such as the browser history stored to browser history file 130. In some embodiments, hyperlink insertion client program 150 will use contextual information to provide corresponding hyperlink insertion recommendations. Contextual information may include location information of the user, web page browsing frequency, information previously associated with a particular contact or group of contacts, information gathered from the textual content of the surrounding text, or other information. For example, if a user visits website A and website B at work, and visits website C and website D at home, hyperlink insertion client program 150 will compare the user's current location information with contextual information such as location information and browsing history to recommend URLs. At home, in this example, the program might suggest website C and website D to the user.

Hyperlink insertion server program 120 operates to suggest and cause hyperlinks to be inserted into program documents, pages, and text fields, such as those created by application server program 110. Hyperlink insertion server program 120 may search a web browser history file, such as browser history file 130, for recently viewed web pages in order to provide a suggestion based upon a keyword or partial keyword input by a user. In some embodiments, hyperlink insertion server program 120 may access a search engine, such as a search engine hosted by search engine server 50, and request that the search engine return results for the keyword input by the user. In yet another embodiment, hyperlink insertion server program may allow a user to search according to contextual information. Contextual information may include location information of the user, web page browsing frequency, information previously associated with a particular contact or group of contacts, information gathered from textual content of the surrounding text, or other information.

In one embodiment, hyperlink insertion server program 120 may use text analytics to parse through textual information surrounding the selected location for the desired hyperlink within application server program 110 to generate contextual information and rank hyperlink suggestions. The textual information surrounding the selected location for the desired hyperlink may be other text in the document, page, email, or other text containing location, preferably text that is near the location for the desired hyperlink (e.g., on the same page, within a certain number of paragraphs from the location of the desired hyperlink). Using natural language processing and at least one set of dictionaries and rules, hyperlink insertion server program 120 can perform text analytics on sections of text to create suggested hyperlinks or to rank search results. In one embodiment, the at least one set of dictionaries and rules may be located on server 30. In another embodiment, the at least one set of dictionaries and rules may be located on any other server or computing device, provided hyperlink insertion client program 150 has access to the at least one set of dictionaries and rules. Text analytics can be performed using an Unstructured Information Management Architecture (UIMA) application configured to analyze unstructured information to discover patterns in the text by processing plain text and identifying entities or relations.

Hyperlink insertion server program 120 may also operate to gather and store contextual information to a file or database, such as contextual information database 140, as a user browses the Internet with a web browser. In one embodiment, hyperlink insertion server program 120 resides on server 30. In other embodiments, hyperlink insertion server program 120 may reside on another server, another computing device, or client computing device 40, provided that hyperlink insertion server program 120 has access to a web browser, a search engine, such as a search engine hosted by search engine server 50, browser history file 130, contextual information database 140, application server program 110, and hyperlink insertion client program 150, and provided that hyperlink insertion server program 120 is accessible to hyperlink insertion client program 150.

Browser history file 130 is a repository that may be written and read by a web browser and/or hyperlink insertion server program 120, such as a web browser on client computing device 40 or server 30. Previously accessed Internet web pages may be stored to browser history file 130. In some embodiments, browser history file 130 may include location information about the client computing device, such as client computing device 40 that connected to the previously viewed and stored web site. Location information may include GPS coordinates, IP address information, location settings selected by a user, or any other information that may indicate the location of the user accessing web pages from the applicable web browser. In one embodiment, browser history file 130 resides on server 30. In another embodiment, browser history file 130 resides on another server, another computing device, client computing device 40, or search engine server 50, provided that browser history file 130 is accessible to the applicable web browser(s) and hyperlink insertion server program 120.

Contextual information database 140 is a repository that may be written and read by hyperlink insertion server program 120. Contextual information may be stored to contextual information database 140. Contextual information may include location information of the user, web page browsing frequency, information previously associated with a particular contact or group of contacts, information related to the content of the text surrounding the hyperlink insertion location, or other information. In one example, contextual information may include information indicating that a hyperlink to a particular webpage has been previously inserted in a communication with a contact. For example, the hyperlink may have been sent by the user to the contact through an office productivity suite with instant messaging (IM) capabilities. In this example, if a user sends the hyperlink to the contact via instant message, hyperlink insertion server program 120 may store the information about the communication to contextual information database 140. When the user in this example chooses to insert a hyperlink in an email to the same contact, hyperlink insertion server program 120 may increasingly suggest the previously sent hyperlink. In one embodiment, contextual information database 140 resides on server 30. In other embodiments, contextual information database 140 may reside on another server, another computing device, or client computing device 40, provided that contextual information database 140 is accessible to hyperlink insertion server program 120.

Figure 2:
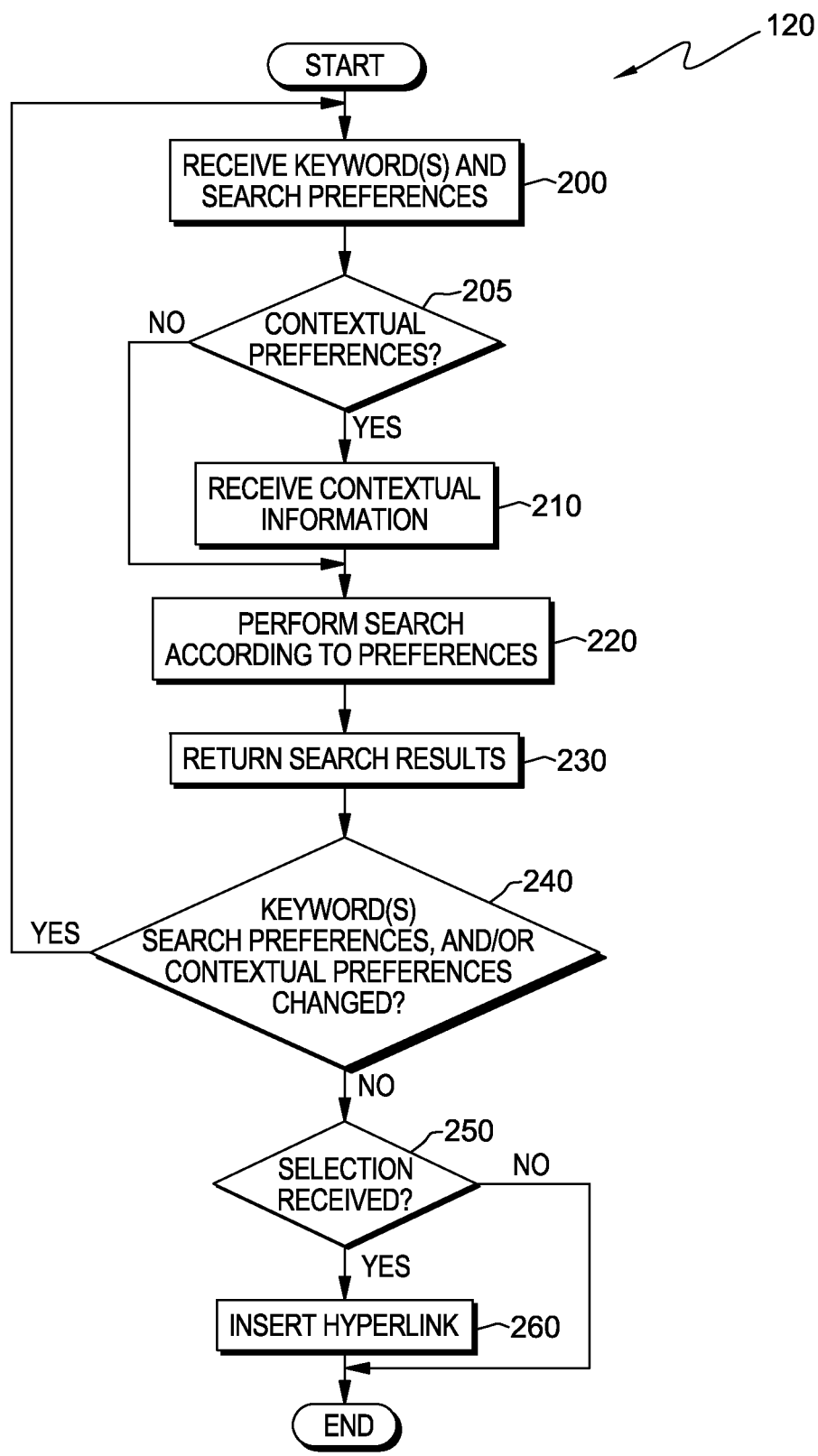
FIG. 2 depicts a flowchart of the steps of a hyperlink insertion server program executing within the computing system of FIG. 1, for recommending uniform resource locator (URL) hyperlinks within an application program based upon the context of the communication and/or the previous browsing history, in accordance with one embodiment of the present invention.

FIG. 2 depicts a flowchart of the steps of hyperlink insertion server program 120 executing within the computing system of FIG. 1. Hyperlink insertion server program 120 creates a search field for accessing browser history or search engine results in order to insert desired hyperlinks into an application. In some embodiments, a user may be able to select and/or customize search preferences, or request that hyperlink insertion server program 120 perform the search according to one or more contextual settings. In one embodiment, hyperlink insertion server program 120 also monitors and stores contextual information about browsing history and usage as a user uses client computing device 40 to browse the Internet. In some embodiments, hyperlink insertion server program 120 may be an add-on to a program, such as application server program 110. In other embodiments, hyperlink insertion server program 120 may be an independent program capable of interacting with application server programs, such as application server program 110.

In one embodiment, initially, a user at client computing device 40 may browse the Internet with a web browser. The web browser may store information such as previously viewed web pages, the time web pages were viewed, the order in which web pages were viewed, the location from which web pages were viewed, or other information. This information may be stored to browser history file 130. As previously mentioned, embodiments of hyperlink insertion server program 120 may monitor and store information, such as the information stored by the web browser to browser history file 130 or contextual information database 140. In some embodiments, hyperlink insertion server program 120 may store additional information, such as web page topics, browsing trends, and additional location information to contextual information database 140.

In one embodiment, a user at client computing device 40 may use application client program 160 to access application server program 110. Application server program 110 may be any program or application that can insert hyperlinks into external or internal locations, documents, or pages. Some examples of application server program 110 might include programs or applications involving word processing, spreadsheets, email, calendaring, conferencing, instant messaging, or any other program or application that allows for the creation and insertion of hyperlinks.

In the current embodiment, hyperlink insertion server program 120 is an add-on to application server program 110. In some embodiments, hyperlink insertion program 120 may be a function fully integrated within a program, such as application server program 110. In other embodiments, hyperlink insertion server program 120 may be a stand-alone hyperlink insertion program capable of interacting with programs, such as application server program 110, and allowing a user to insert a hyperlink according to the input search keyword(s) and/or desired search and contextual preferences.

In step 200, hyperlink insertion server program 120 receives a keyword, a partial keyword, or keywords, and search preferences from hyperlink insertion client program 150. Search preferences may include what set of information is to be searched, organizational methods, or other preferences. For example, search preferences may indicate that the information to be searched is the internet browsing history (such as the internet browsing history stored to browser history file 130), the contents of the pages stored within the internet browsing history, the Internet (through a search engine, such as the search engine managed by search engine server 50), or a combined group of sources. Search preference organizational methods may allow the search results to be sorted by date, number of hits, source credibility, or other organizational methods. Search results sorted by date may be either chronological or reverse chronological. Search results sorted by number of hits may be organized according to hit frequency by a general population of the Internet, or according to the frequency of visits for a particular user. In an exemplary embodiment, hyperlink insertion server program 200 will begin to display potential search terms for hyperlink insertion as a partial keyword is entered. For example, if a user has typed "bas-," hyperlink insertion server program may use the search preferences and/or applicable contextual information and preferences to return previously visited or currently search web pages such as "www.baseball.com," "www.basketball.com," or "www.hobby.com/basketweaving."

In decision 205, hyperlink insertion server program 120 determines whether contextual preferences exist and/or are to be used to return hyperlink insertion search results. As previously discussed, hyperlink insertion server program 120 may store contextual information to contextual information database 140 as a user, such as a user on client computing device 40, browses the internet.

Contextual information may include any information that could be used to give context to a particular accessed link, or hyperlink inserted in another form of communication, such as a hyperlink inserted within an instant messaging conversation. For example, contextual information may include the location from which a particular web page was accessed, the frequency from which a particular web page is accessed from a particular location, or suggestions as to the general topic of the hyperlink based upon textual analysis of the text surrounding the desired location of the hyperlink.

Location information may be obtained by hyperlink insertion server program 120 by the Internet Protocol (IP) address of the computing device the user used to access the web page, or alternatively, by the global positioning system (GPS) coordinates of the computing device the user used to access the web page. GPS coordinates may be available, for instance, with mobile smart phones, and other similar devices. Location information may also be obtained by a designation from a user of the computing device used to access the web page.

Contextual preferences may include preferences that organize hyperlink insertion suggestions according to contextual information. For instance, contextual preferences may indicate that hyperlink insertion suggestions should be organized according to webpage visit frequency at the current location. Depending upon the type of location information used, different predetermined thresholds may exist to determine if a device matches the current location where the web page was previously viewed. For example, if the location information is an internet protocol (IP) address, there may be no threshold and the location information required to be at the location where the web page was previously viewed may be determined by matching the entire IP address. However, if the location information is GPS coordinates, there may be an associated threshold that allows a user to be in a different but nearby location to the GPS coordinates associated with the previously viewed web page. The associated predetermined thresholds may by customizable by a user, or alternatively, predetermined thresholds may be determined by a developer and included within hyperlink insertion client program 150 and/or hyperlink insertion server program 120. In one example, contextual preferences may indicate that hyperlink insertion suggestions should be organized according to hyperlinks previously inserted in a communication with a specific contact or group of contacts via email, instant message (IM), or another method of communication. In another example, hyperlink insertion suggestions may be organized according to the current location. For example, if an event is occurring near the location of the user, hyperlink insertion server program may return suggested hyperlinks related to that particular event, based upon the keyword(s) indicated by the user.

If hyperlink insertion server program 120 determines that there is no relevant contextual information (decision 205, no branch), hyperlink insertion server program 120 will perform the search for hyperlink suggestions based on the inserted keyword(s), according to selected search preferences. If hyperlink insertion server program 120 determines that there is relevant contextual information (decision 205, yes branch), hyperlink insertion server program 120 will receive contextual preferences and relevant contextual information. Contextual preferences and contextual information may be stored to contextual information database 140. In some embodiments, hyperlink insertion server program 120 may gather additional contextual information by performing text analytics on the surrounding text of the document or other composition. For example, hyperlink insertion server program 120 may perform text analytics on the contents of an email when a user selects to insert a hyperlink, and suggestions for hyperlink insertion may be made based upon the analyzed text, keyword(s), browser history, web search, or some combination of the preceding variables according to the applicable preferences.

In step 220, hyperlink insertion server program 120 may perform a search for hyperlink suggestions based on all applicable preferences. If search preferences indicate that hyperlink insertion server program 120 shall search browser history, hyperlink insertion server program 120 may cause browser history file 130 to be searched accordingly. In some embodiments, hyperlink insertion server program 120 may use a search engine, such as the search engine managed by search engine server 50 to search the contents of the uniform resource locators (URLs) located in browser history file 130 for input keyword(s). If search preferences indicate that hyperlink insertion server program 120 will search the Internet, hyperlink insertion server program 120 will cause a search engine, such as the search engine managed by search engine server 50 to search the Internet for the selected keyword(s) and return hyperlink insertion suggestion results.

In step 230, hyperlink insertion server program 130 returns search results according to preferences and the performed search. Returned search results may be organized according to previously selected preferences, and a user at client computing device 40 may be able to sort returned results using a user interface, such as the user interface depicted and described with respect to FIG. 3.

In decision 240, hyperlink insertion server program 120 determines if keyword(s), search preferences, and/or contextual preferences or contextual information have changed from initial input and selection of the request to return search results for suggested hyperlinks. If hyperlink insertion server program 120 determines that changes have occurred since the initial request to return search results for suggested hyperlinks (decision 240, yes branch), hyperlink insertion program will receive the updated keyword(s) and search preferences, and continue accordingly (see step 200).

If hyperlink insertion server program 120 determines that changes have not occurred since the initial selection (decision 240, no branch), hyperlink insertion program 120 may determine if a returned search result has been selected for hyperlink insertion (decision 250). After a period of time, if no selection is received (decision 250, no branch), hyperlink insertion server program may end until a subsequent initiation of the program. If a selection is received (decision 250, yes branch), hyperlink insertion server program 120 will cause the selected hyperlink to be inserted into the desired location of the page, document, or other location within the application or program, as indicated. For example, the desired location may be within the text of an email, wherein the email is being written within an email client program or all-purpose office productivity suite. While inserting the hyperlink, options may be provided by an interface of hyperlink insertion client program 150 to select text or an image for display, rather than the URL or other page that the hyperlink directs to. Upon inserting the hyperlink, hyperlink insertion server program 120 is complete. Hyperlink insertion server program 120 may continue to monitor browsing tendencies and contextual information, as previously disclosed.

Figure 3:
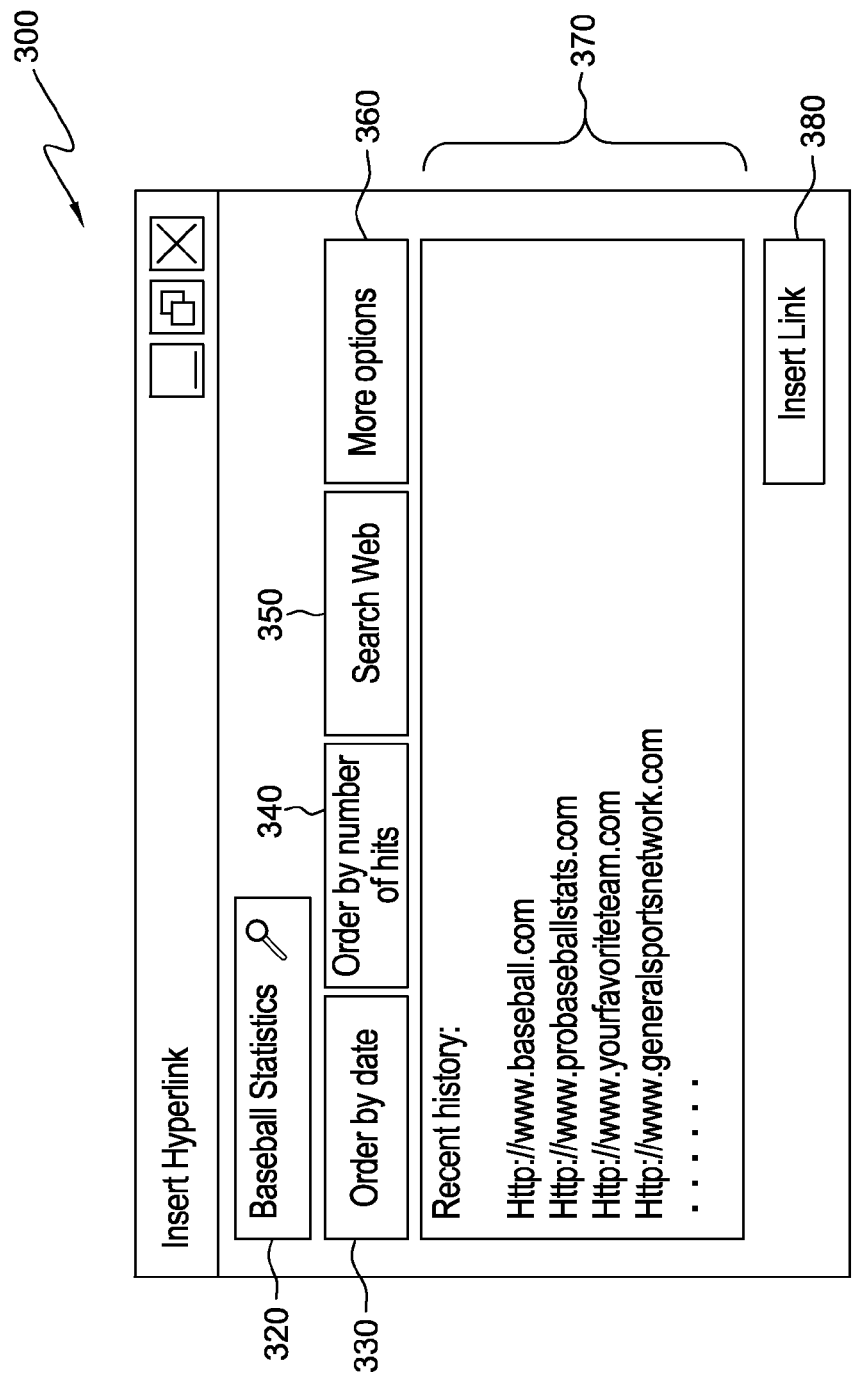
FIG. 3 is an exemplary user interface to a hyperlink insertion client program in accordance with one embodiment of the present invention.

FIG. 3 is an exemplary user interface window to a hyperlink insertion client program in accordance with one embodiment of the present invention. User interface window 300 may be a user interface window within hyperlink insertion client program 150 of client computing device 40 of FIG. 1. User interface window 300 allows a user to find and insert a hyperlink into a program or application by searching or receiving suggestions according to the methods previously described. In one embodiment, user interface window 300 may be a pop-up window that appears when a user selects an insert hyperlink option. In another embodiment, user interface window 300 may open as a tab, or toolbar within application client program 160 or application server program 110. In the depicted embodiment, user interface window 300 is shown as viewed by a user of hyperlink insertion client program 150.

User interface window 300 of hyperlink insertion client program 150 contains search field 320, order by date button 330, order by number of hits button 340, search web button 350, more options button 360, search results list 370, and insert link button 380. Search field 320 allows for the insertion of a search term or partial search term. In some embodiments, the search may occur and suggestions may be returned as the search term is entered into search field 320, in other embodiments the search may occur after the search term has been completely entered and an indication to perform the search has occurred. An indication to perform the search may be by clicking a search button or hitting an "enter" key.

Order by date button 330 will organize search results according to the date they were accessed, beginning with either the most recently accessed or the least recently accessed, and progressing accordingly. Order by number of hits button 340 will organize search results by the number of hits the webpage has received. In some embodiments, order by number of hits button 340 will organize search results by the number of hits by the user over a specified time period. In other embodiments, order by number of hits button 340 will organize search results by the number of hits by the general population over a specified period of time.

Search web button 350 will toggle search results from browser history, as stored to browser history file 130, to search engine results, such as search results gathered by the search engine of search engine server 50. In some embodiments, when search results being displayed originate from a search engine, such as the search engine of search engine server 50, search web button 350 may allow the user to toggle back to a search of a browser history, such as the browser history stored to browser history file 130.

More options button 360 may have additional options and features to assist a user in searching for a hyperlink for insertion into the applicable document or application. For example, more options 360 may contain many of the contextual search options previously discussed, such as location-based searching, searches based upon prior communications with involved contacts, searching based upon textual analysis of surrounding text, or other options that may focus the search results.

Search results list 370 displays the suggested hyperlinks for insertion based upon the results of the hyperlink search. In the current illustration, search results list 370 displays the results as hyperlinks. In some embodiments, the results may be displayed by the title of the web page, or with a thumbnail of the contents of the web page.

Insert link button 380 is a button that, when selected, will insert the selected hyperlink into the document, email, or other application being used. Insert link button 380 may insert the hyperlink to the previously selected location. In some embodiments, hyperlink insertion server program 120 may prompt the user as to additional information about the hyperlink, such as if the hyperlink should appear as a picture or alternate form of text.

It should be recognized by one skilled in the art that the preceding description is merely one example of a user interface, and other user interfaces are contemplated by the current invention. For example, rather than a user interface window, an embodiment may allow a user to select a hyperlink menu button, and then type a search term or hyperlink. As the search term or hyperlink is entered, results can be displayed underneath the entered information.

Figure 4:
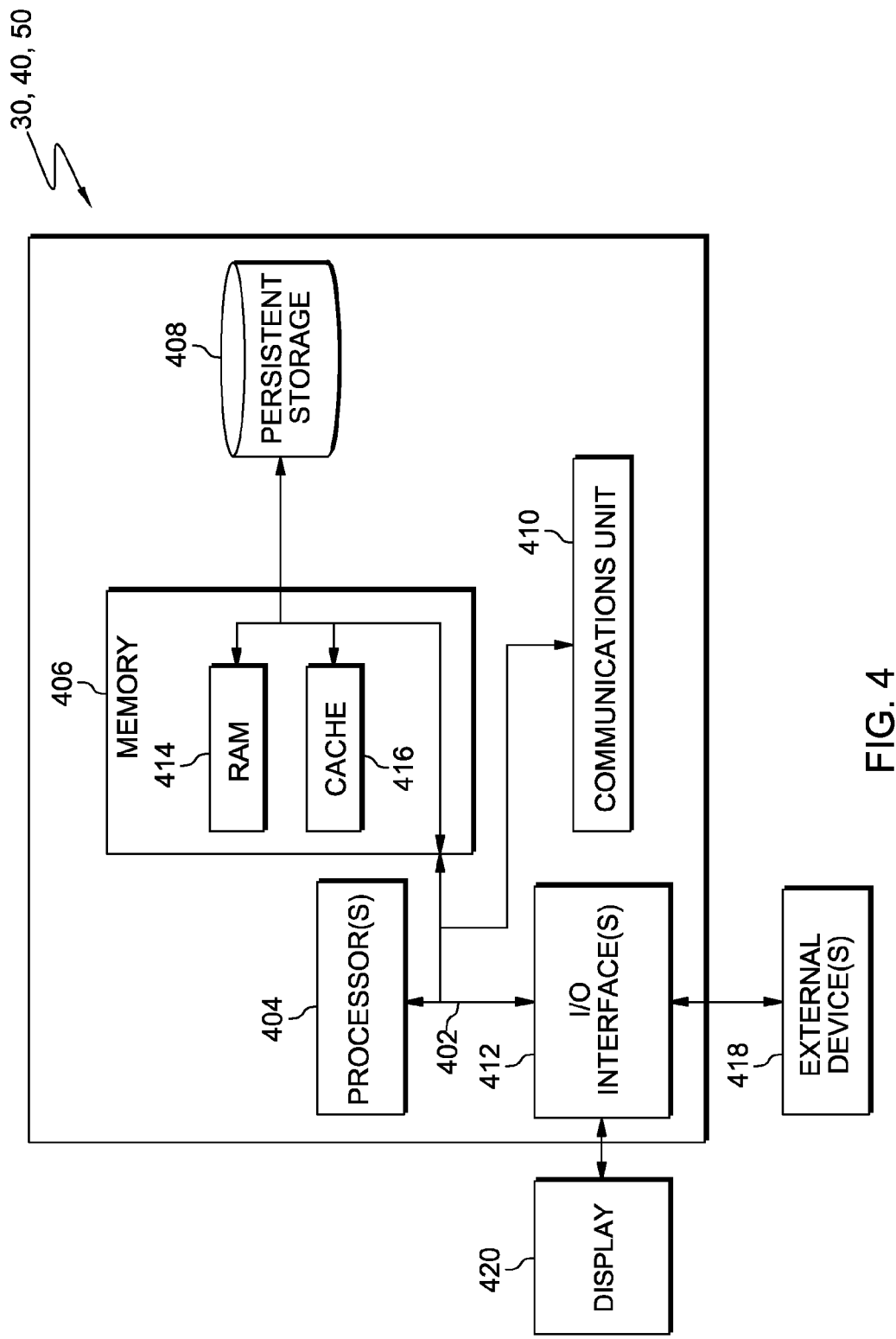
FIG. 4 depicts a block diagram of components of the client computing device, server, or search engine server in accordance with one embodiment of the present invention.

FIG. 4 depicts a block diagram of components of server 30, client computing device 40, or search engine server 50 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Server 30, client computing device 40, or search engine server 50 can each include communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Application server program 110, hyperlink insertion server program 120, browser history file 130, and contextual information database 140 are stored in persistent storage 408 of server 30 for execution and/or access by one or more of the respective computer processors 404 of server 30 via one or more memories of memory 406 of server 30. Hyperlink insertion client program 150 and application client program 160 are stored for execution by one or more of the respective computer processors 404 of client computing device 40 via one or more memories of memory 406 of client computing device 40. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Application server program 110, hyperlink insertion server program 120, browser history file 130, and contextual information database 140 may be downloaded to persistent storage 408 of server 30 through communication unit 410 of server 30. Hyperlink insertion client program 150 and application client program 160 may be downloaded to persistent storage 408 through communications unit 410 of client computing device 40.

I/O interface(s) 412 allows for input and output of data with other devices that may be connected to server 30, client computing device 40, or search engine server 50. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., application server program 110, hyperlink insertion server program 120, browser history file 130, and contextual information database 140, can be stored on such portable computer-readable storage media and can be loaded onto persistent storage 408 of server 30 via I/O interface(s) 412 of server 30. Software and data used to practice embodiments of the present invention, e.g., hyperlink insertion client program 150 and application client program 160, can be stored on such portable computer-readable storage media and can be loaded onto persistent storage 408 of client computing device 40 via I/O interface(s) 412 of client computing device 40. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for identifying and inserting hyperlinks within a software application, the method comprising:
   receiving a request, from a sender, for one or more recommended hyperlinks, wherein:
      the request includes a keyword, a search requirement, and corresponds to a location for a hyperlink insertion in a first communication with a first contact using a software application;
      the search requirement is that information to be searched is exclusively contents of websites stored within an Internet browsing history; and
      the first communication with the first contact utilizes a first method of communication;
   receiving contextual information about the request, wherein the contextual information includes a first hyperlink previously inserted into a second communication with the first contact, and wherein the second communication with the first contact utilizes a second method of communication;
   determining, by one or more processors, that the keyword is within contents of a first website accessible by the first hyperlink and that the first website is stored within the Internet browsing history;
   presenting, by one or more processors, one or more hyperlinks, including the first hyperlink, for selection by the sender, corresponding to the contextual information, the keyword, and the search requirement, based on the previous insertion of the first hyperlink into the second communication with the first contact and presence of the keyword within contents of the first website accessible by the first hyperlink;
   receiving a selected hyperlink from the one or more hyperlinks; and
   inserting the selected hyperlink at the location in the first communication with the first contact.

2. The method of claim 1, wherein the step of receiving a selected hyperlink from the one or more hyperlinks comprises:
   receiving a selected hyperlink from the one or more hyperlinks displayed on the user interface.

3. The method of claim 1, wherein the contextual information further comprises location information from a device.

4. The method of claim 3, wherein the step of presenting, by one or more processors, one or more hyperlinks further comprises:
   determining, by one or more processors, that the received location information from the device matches, within a predetermined threshold, a location at which a second hyperlink was previously accessed by the device; and
   presenting, by one or more processors, the second hyperlink.

5. The method of claim 1, wherein the step of receiving contextual information about the request further comprises:
   retrieving textual information near the location in the first communication with the first contact; and
   analyzing, by one or more processors, the text of the textual information near the location in the first communication with the first contact to determine contextual information.

6. The method of claim 1, wherein:
   the software application further includes the second method of communication.

7. A computer program product for identifying and inserting hyperlinks within a software application, the computer program product comprising:
   one or more computer-readable storage media and program instructions stored on the one or more computer-readable storage media, wherein the one or more computer readable storage media are not transitory signals per se, the program instructions comprising:
   program instructions to receive a request, from a sender, for one or more recommended hyperlinks, wherein:
      the request includes a keyword, a search requirement, and corresponds to a location for a hyperlink insertion in a first communication with a first contact using a software application;
      the search requirement is that information to be searched is exclusively contents of websites stored within an Internet browsing history; and
      the first communication with the first contact utilizes a first method of communication;
   program instructions to receive contextual information about the request, wherein the contextual information includes a first hyperlink previously inserted into a second communication with the first contact, and wherein the second communication with the first contact utilizes a second method of communication;

program instructions to determine that the keyword is within contents of a first website accessible by the first hyperlink and that the first website is stored within the Internet browsing history;

program instructions to present one or more hyperlinks, including the first hyperlink, for selection by the sender, corresponding to the contextual information, the keyword, and the search requirement, based on the previous insertion of the first hyperlink into the second communication with the first contact and presence of the keyword within contents of the first website accessible by the first hyperlink;

program instructions to receive a selected hyperlink from the one or more hyperlinks; and program instructions to insert the selected hyperlink at the location in the first communication with the first user.

8. The computer program product of claim 7, wherein program instructions to receive a selected hyperlink from the one or more hyperlinks comprise:

program instructions to receive a selected hyperlink from the one or more hyperlinks displayed on the user interface.

9. The computer program product of claim 7, wherein the contextual information further comprises location information from a device.

10. The computer program product of claim 9, wherein program instructions to identify one or more hyperlinks further comprises:

program instructions to determine that the received location information from the device matches, within a predetermined threshold, a location at which a second hyperlink was previously accessed by the device; and program instructions to present the second hyperlink.

11. The computer program product of claim 7, wherein program instructions to receive contextual information about the request further comprises:

program instructions to retrieve textual information near the location in the first communication with the first contact; and program instruction to analyze the text of the textual information near the location in the first communication with the first contact to determine contextual information.

12. The computer program product of claim 7, wherein: the software application further includes the second method of communication.

13. A computer system for identifying and inserting hyperlinks within a software application, the computer system comprising:

one or more computer processors, one or more computer-readable storage media, and program instructions stored on the computer-readable storage media for execution by at least one of the one or more processors, the program instructions comprising:

program instructions to receive a request, from a sender, for one or more recommended hyperlinks, wherein:
the request includes a keyword, a search requirement, and corresponds to a location for a hyperlink insertion in a first communication with a first contact using a software application;
the search requirement is that information to be searched is exclusively contents of websites stored within an Internet browsing history; and
the first communication with the first contact utilizes a first method of communication;

program instructions to receive contextual information about the request, wherein the contextual information includes a first hyperlink previously inserted into a second communication with the first contact, and wherein the second communication with the first contact utilizes a second method of communication;

program instructions to determine that the keyword is within contents of a first website accessible by the first hyperlink and that the first website is stored within the Internet browsing history;

program instructions to present one or more hyperlinks, including the first hyperlink, for selection by the sender, corresponding to the contextual information, the keyword, and the search requirement, based on the previous insertion of the first hyperlink into the second communication with the first contact and presence of the keyword within contents of the first website accessible by the first hyperlink;

program instructions to receive a selected hyperlink from the one or more hyperlinks; and program instructions to insert the selected hyperlink at the location in the first communication with the first user.

14. The computer system of claim 13, wherein program instructions to receive a selected hyperlink from the one or more hyperlinks comprises:

program instructions to receive a selected hyperlink from the one or more hyperlinks displayed on the user interface.

15. The computer system of claim 13, wherein the contextual information further comprises location information from a device.

16. The computer system of claim 15, wherein program instructions to identify one or more hyperlinks further comprises:

program instructions to determine that the received location information from the device matches, within a predetermined threshold, a location at which a second hyperlink was previously accessed by the device; and program instructions to present the second hyperlink.

* * * * *